(12) United States Patent
Suzuki

(10) Patent No.: US 12,410,311 B2
(45) Date of Patent: Sep. 9, 2025

(54) RESIN COMPOSITION AND MULTILAYERED STRUCTURE USING SAME

(71) Applicant: KURARAY CO., LTD., Okayama (JP)

(72) Inventor: Makoto Suzuki, Kurashiki (JP)

(73) Assignee: KURARAY CO., LTD., Okayama (JP)

( * ) Notice: Subject to any disclaimer, the term of this patent is extended or adjusted under 35 U.S.C. 154(b) by 779 days.

(21) Appl. No.: 17/435,542

(22) PCT Filed: Mar. 4, 2020

(86) PCT No.: PCT/JP2020/009068
§ 371 (c)(1),
(2) Date: Sep. 1, 2021

(87) PCT Pub. No.: WO2020/179811
PCT Pub. Date: Sep. 10, 2020

(65) Prior Publication Data
US 2022/0041850 A1    Feb. 10, 2022

(30) Foreign Application Priority Data

Mar. 4, 2019  (JP) .................................. 2019-038869

(51) Int. Cl.
  *C08L 29/04*  (2006.01)
  *C08L 23/08*  (2006.01)
  (Continued)

(52) U.S. Cl.
  CPC .............. *C08L 29/04* (2013.01); *C08L 23/08* (2013.01); *C08L 33/08* (2013.01); *C08L 47/00* (2013.01)

(58) Field of Classification Search
  CPC ........ C08L 29/04; C08L 51/04; C08F 285/00; C08F 220/14; C08F 222/102
  See application file for complete search history.

(56) References Cited

U.S. PATENT DOCUMENTS 4,129,608 A    12/1978  Murayama et al.
6,447,858 B1    9/2002  Shimo et al.
(Continued)

FOREIGN PATENT DOCUMENTS

CN    102782040 A    11/2012
CN    105086380 A    11/2015
(Continued)

OTHER PUBLICATIONS

International Search Report issued in corresponding International Patent Application No. PCT/JP2020/009068 dated May 26, 2020.

*Primary Examiner* — Anthony J Frost
(74) *Attorney, Agent, or Firm* — Morgan, Lewis & Bockius LLP

(57) ABSTRACT

A resin composition is provided, wherein polymer particles are dispersed in a matrix of an ethylene-vinyl alcohol copolymer and the polymer particles have a sea-island structure, and one of a sea component and an island component has a glass transition temperature of 30° C. or more and the other has a glass transition temperature of −10° C. or less. The resin composition has high gas barrier properties and is also excellent in impact resistance, particularly impact resistance at low temperatures.

20 Claims, 1 Drawing Sheet

(51) Int. Cl.
*C08L 33/08* (2006.01)
*C08L 47/00* (2006.01)

(56) References Cited

U.S. PATENT DOCUMENTS

| | | | | |
|---|---|---|---|---|
| 2010/0165460 A1* | 7/2010 | Furui | ............... | G02F 1/133502 |
| | | | | 359/488.01 |
| 2012/0328866 A1* | 12/2012 | Inoue | .................. | C08J 5/18 |
| | | | | 428/220 |
| 2015/0247026 A1* | 9/2015 | Shibata | .................. | C08L 25/08 |
| | | | | 525/77 |
| 2015/0329715 A1 | 11/2015 | Zilles et al. | | |
| 2015/0337131 A1 | 11/2015 | Nakajima et al. | | |
| 2016/0177077 A1* | 6/2016 | Nelliappan | ............ | C08F 285/00 |
| | | | | 524/504 |
| 2017/0275432 A1* | 9/2017 | Owaki | ................... | C08J 9/0061 |
| 2017/0369613 A1* | 12/2017 | Chow | ...................... | C08K 9/04 |
| 2019/0169431 A1* | 6/2019 | Kurihara | ................ | C08L 77/02 |

FOREIGN PATENT DOCUMENTS

| | | | |
|---|---|---|---|
| JP | S53-31753 | A | 3/1978 |
| JP | H05-078540 | A | 3/1993 |
| JP | H09-249782 | A | 9/1997 |
| JP | H10-024505 | A | 1/1998 |
| JP | 2003-328278 | A | 11/2003 |
| JP | 2006-104275 | A | 4/2006 |
| JP | 2006-282727 | A | 10/2006 |
| JP | 2011-148887 | A | 8/2011 |
| JP | 2011-208135 | A | 10/2011 |
| JP | 2016-500405 | A | 1/2016 |
| WO | 01/27515 | A1 | 4/2001 |
| WO | WO-2018008611 | A1 * | 1/2018 ............... C08J 5/00 |

* cited by examiner

[FIG. 1]
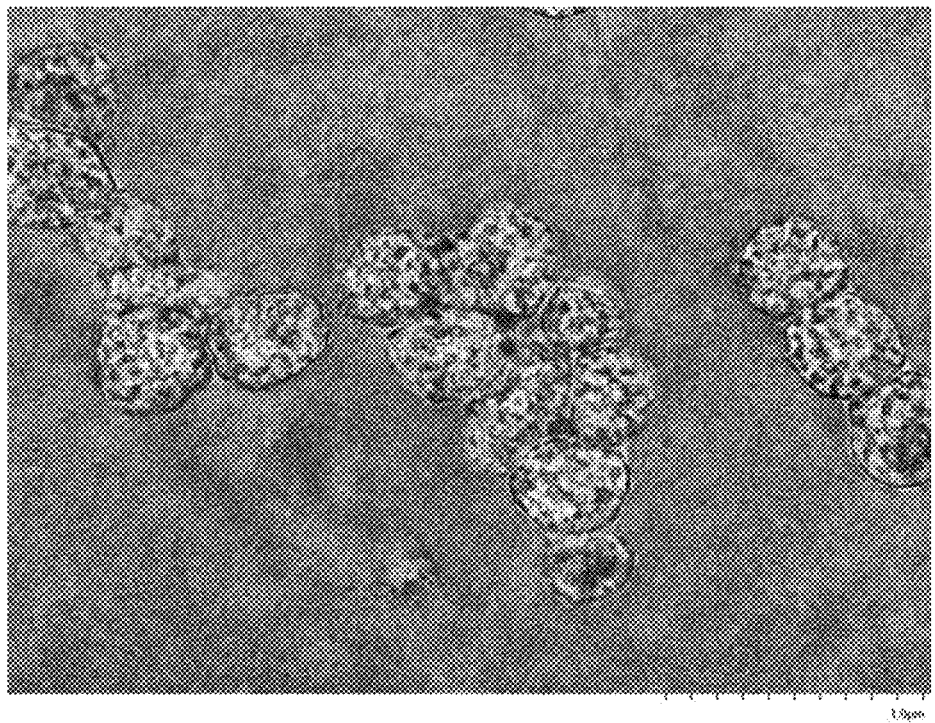
[FIG. 2]
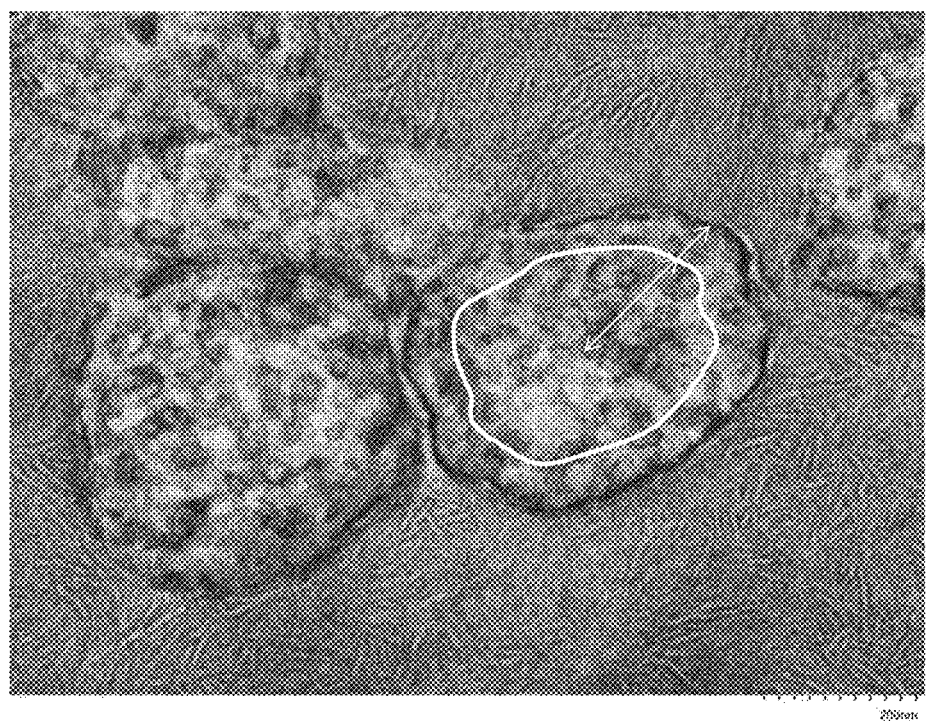

RESIN COMPOSITION AND MULTILAYERED STRUCTURE USING SAME

TECHNICAL FIELD

The present invention relates to a resin composition wherein polymer particles are dispersed in a matrix of an ethylene-vinyl alcohol copolymer. The present invention also relates to a multilayer structure having a layer of such a resin composition.

BACKGROUND ART

Ethylene-vinyl alcohol copolymers (hereinafter, may be abbreviated as EVOH) exhibit excellent gas barrier properties to gases, such as oxygen, and are also excellent in melt moldability, and thus are widely used as packaging materials for foods, pharmaceuticals, medical equipment and supplies, garments, and the like. EVOH is also excellent in barrier properties to fuels, such as gasoline, and thus also used for fuel tanks, fuel pipes, and the like. However, EVOH is a relatively less flexible resin sometimes causes insufficient impact resistance of molded articles to be obtained.

As a method of improving flexibility of a resin, there is a method comprising adding polymer particles having a core-shell structure with a rubber layer (core) and a hard layer (shell) covering its outer periphery to the resin. Patent Document 1 describes that a resin composition containing EVOH and multilayered polymer particles with an inner layer (core) of acrylic rubber having butyl acrylate as a main component or the like and an outermost layer (shell) of methyl polymethacrylate or the like is excellent in gas barrier properties and flexibility and is useful as a material for bottles and the like seeking impact resistance.

PRIOR ART DOCUMENT

Patent Document

Patent Document 1: JP 9-249782 A

SUMMARY OF THE INVENTION

Problems to be Solved by the Invention

However, molded articles obtained using the resin composition described in Patent Document 1 leaves room for improvement in impact resistance, particularly impact resistance at low temperatures. The present invention has been made to solve the above problems, and it is an object thereof to provide a resin composition with excellent gas barrier properties and impact resistance.

Means for Solving the Problems

The above problems are solved by providing a resin composition, wherein
polymer particles are dispersed in a matrix of an EVOH and
the polymer particles have a sea-island structure, and one of a sea component and an island component has a glass transition temperature (hereinafter, may be abbreviated as a Tg) of 30° C. or more and the other has a Tg of −10° C. or less.

In this context, it is preferred that the sea component has a Tg of −10° C. or less and the island component has a Tg of 30° C. or more. It is preferred that an area ratio of a polymer component with a Tg of 30° C. or more to a polymer component with a Tg of −10° C. or less is from 5/95 to 70/30 in a transmission electron microscope image of a cross section of the polymer particles. It is also preferred that the polymer particles have a surface covered with a film formed of a same polymer component as the island component.

It is also preferred that the polymer particles aggregate and form secondary particles. In this context, it is more preferred that the polymer particles have an average primary particle diameter from 0.2 to 1 µm. It is also more preferred that the polymer particles have an average secondary particle diameter from 1.1 to 10 µm.

It is preferred that the polymer particles contain an acrylic polymer or a conjugated diene polymer. It is preferred that a mass ratio of the polymer particles to the EVOH is from 1/99 to 40/60. It is preferred that the EVOH has an ethylene content from 20 to 50 mol %.

A preferred embodiment of the present invention is a multilayer structure comprising a layer of the resin composition.

Effects of the Invention

The resin composition of the present invention has high gas barrier properties and is also excellent in impact resistance, particularly impact resistance at low temperatures. The resin composition is, thus, useful as packaging materials for foods, pharmaceuticals, medical equipment and supplies, garments, and the like and is also useful as a material for fuel tanks, fuel pipes, and the like seeking impact resistance at low temperatures.

BRIEF DESCRIPTION OF THE DRAWINGS

FIG. 1 is a transmission electron microscope image of a cross section of the polymer particles in resin composition pellets in Example 1.

FIG. 2 is a transmission electron microscope image of a cross section of the polymer particles in resin composition pellets in Example 1.

MODES FOR CARRYING OUT THE INVENTION

The resin composition of the present invention is a resin composition wherein polymer particles are dispersed in a matrix of an EVOH and the polymer particles have a sea-island structure, and one of a sea component and an island component has a Tg of 30° C. or more and the other has a Tg of −10° C. or less.

EVOH

EVOH used in the present invention is a copolymer having ethylene units and vinyl alcohol units. The EVOH is generally obtained by saponifying an ethylene-vinyl ester copolymer. The EVOH may contain vinyl ester units. The ethylene-vinyl ester copolymer may be produced and saponified by a known method. Examples of vinyl ester used for production of the ethylene-vinyl ester copolymer may include fatty acid vinyl esters, such as vinyl formate, vinyl acetate, vinyl propionate, vinyl valerate, vinyl caprate, vinyl laurate, vinyl stearate, vinyl pivalate, and vinyl versatate, and among all, vinyl acetate is preferred.

The EVOH preferably has an ethylene unit content of 20 mol % or more and more preferably 25 mol % or more. An ethylene unit content of less than 20 mol % may cause reduction in thermal stability of the resin composition, and reduction in flexibility, leading to reduction in impact resistance. Meanwhile, the ethylene unit content in the EVOH is preferably 50 mol % or less and more preferably 35 mol % or less. An ethylene unit content in the EVOH of more than 50 mol % may cause reduction in gas barrier properties of the resin composition. The ethylene unit content and the degree of saponification of the EVOH may be obtained by nuclear magnetic resonance (NMR).

The EVOH preferably has a degree of saponification of 90 mol % or more, more preferably 95 mol % or more, and even more preferably 99 mol % or more. The EVOH having a degree of saponification of 90 mol % or more causes further improvement of gas barrier properties, thermal stability, and moisture resistance. The EVOH generally has a degree of saponification of 99.97 mol % or less and preferably 99.94 mol % or less.

Without impairing the objects of the present invention, the EVOH may have a unit derived from a monomer other than ethylene, vinyl ester, and a saponified product thereof. The content of units derived from such another monomer in the EVOH is preferably 30 mol % or less based on the total monomer units in the EVOH, more preferably 20 mol % or less, even more preferably 10 mol % or less, and particularly preferably 5 mol % or less. When the EVOH contains the unit derived from another monomer, the content is preferably 0.05 mol % or more based on the total monomer units in the EVOH and more preferably 0.10 mol % or more. Examples of such another monomer may include: unsaturated acids, such as acrylic acid, methacrylic acid, crotonic acid, and itaconic acid, and anhydrides, salts, mono- and di-alkyl esters thereof, and the like; nitriles, such as acrylonitrile and methacrylonitrile; amides, such as acrylamide and methacrylamide; olefinsulfonic acids, such as vinylsulfonic acid, allylsulfonic acid, and methallylsulfonic acid and salts thereof; vinylsilane compounds, such as vinyltrimethoxysilane, vinyltriethoxysilane, vinyltri(β-methoxy-ethoxy)silane, and γ-methacryloxypropylmethoxysilane; alkyl vinyl ethers; vinyl ketone; N-vinylpyrrolidone; vinyl chloride; vinylidene chloride; and the like.

The EVOH preferably has a melt flow rate (MFR) (measured at 210° C. under a load of 2160 g) from 0.1 to 100 g/10 min. The EVOH having a MFR of more than 100 g/10 min. may cause reduction in strength of molded articles to be obtained. The EVOH more preferably has a MFR of 50 g/10 min or less, and even more preferably 30 g/10 min or less. Meanwhile, the EVOH having a MFR of less than 0.1 g/10 min. may cause difficulty in melt molding. The EVOH more preferably has a MFR of 0.5 g/10 min. or more.

One type of the EVOH may be used singly or two or more types of them may be used together.

Polymer Particles

The polymer particles used in the present invention have a sea-island structure. FIGS. 1 and 2 are transmission electron microscope images of a cross section of the polymer particles in resin composition pellets in Example 1 described later. As illustrated in FIGS. 1 and 2, the polymer particles (primary particles) of the present invention have a sea-island structure with a plurality of island components (dark regions) and a sea component (light region) surrounding the island components. The sea-island structure in the present invention refers to structures having a plurality of island components and excludes a core-shell structure, in which one core is covered with a shell surrounding the core. It should be noted that the plurality of polymer particles (primary particles) preferably aggregate and form secondary particles in the matrix of the EVOH.

FIGS. 1 and 2 are transmission electron microscope images of the cross section of polymer particles electron stained using a phosphomolybdic acid solution. The island components (dark regions) are formed of a polymer component containing methyl methacrylate with a Tg of 106° C. as a main component, and the sea component (light region) is formed of a polymer component containing butyl acrylate with a Tg of −39° C. as a main component. As just described, in the present invention, either the sea component or the island components constituting the polymer particles has to have a Tg of 30° C. or more and the other has to have a Tg of −10° C. or less. In the polymer particles shown in FIGS. 1 and 2, the dark regions are the polymer component with a Tg of 30° C. or more and the light region is the polymer component with a Tg of −10° C. or less, whereas the dark regions and the light region may be inverted depending on the type and the like of the polymer components constituting the polymer particles.

The polymer particles may have the sea component with a Tg of −10° C. or less and the island components with a Tg of 30° C. or more, or may have the sea component with a Tg of 30° C. or more and the island components with a Tg of −10° C. or less. It is important that the polymer particles of the present invention form a sea-island structure where, in either polymer component (sea component), a plurality of the other polymer components (island components) are dispersed. Surprisingly, the polymer particles having such a sea-island structure are capable of greatly improving impact resistance of molded articles of the resin composition containing the EVOH compared with conventional polymer particles having a core-shell structure. From the perspective of further improvement of impact resistance, it is preferred that the sea component has a Tg of −10° C. or less and the island components have a Tg of 30° C. or more.

It is preferred that an area ratio (high Tg component/low Tg component) of a polymer component with a Tg of 30° C. or more (high Tg component) to a polymer component with a Tg of −10° C. or less (low Tg component) is from 5/95 to 70/30 in the transmission electron microscope image of the cross section of the polymer particles. An area ratio (high Tg component/low Tg component) of less than 5/95 sometimes causes reduction in handleability of collection of the polymer particles. The area ratio (high Tg component/low Tg component) is more preferably 10/90 or more. Meanwhile, an area ratio (high Tg component/low Tg component) of more than 70/30 may cause insufficient impact resistance of the resin composition. The area ratio (high Tg component/ low Tg component) is more preferably 60/40 or less and even more preferably 50/50 or less. The area ratio (high Tg component/low Tg component) is calculated by binarizing the transmission electron microscope image of the cross section of the polymer particles, followed by obtaining the area ratio of the dark regions to the light regions in the polymer particles. The binarized transmission electron microscope image is obtained by a method described in Examples.

FIGS. 1 and 2 show that the same dark region as the island components is formed on the outer periphery of the polymer particles. From the perspective of handleability and the like of the polymer particles, it is preferred that the polymer particles of the present invention have a sea-island structure and have a surface covered with a film formed of the same polymer component as the island components. When such a film is formed, a ratio (thickness of the film/average primary particle diameter) of the thickness of the film to an average primary particle diameter of the polymer particles is preferably from 0.001 to 0.1 in the transmission electron microscope image of the cross section of the polymer particles. The ratio (thickness of the film/average primary particle diameter) is more preferably 0.003 or more. Meanwhile, the ratio (thickness of the film/average primary particle diameter) is more preferably 0.045 or less. The average primary particle diameter of the polymer particles, the thickness of the film, and an average secondary particle diameter of the polymer particles described later are calculated from the same transmission electron microscope image of the cross section of the polymer particles as that used for calculation of the area ratio (high Tg component/low Tg component). It should be noted that the particle diameter of the polymer particles is obtained as an arithmetic average of the longest lengths of the particles, and the average particle diameter is calculated from the number and the particle diameters of particles contained in an observation visual field.

It is preferred that an area rate of the total area of the island components in a region where a distance from the center of gravity of the cross section of the polymer particles (primary particles) is 75% or less of a distance from the center of gravity to the contour of the cross section to the total area of the island components in the cross section is 0.1 or more. The island components thus contained in a central area of the polymer particles causes further improvement of impact resistance of the resin composition. The area rate is preferably 0.9 or less.

Examples of the polymer component with a Tg of −10° C. or less constituting the polymer particles may include: acrylic polymers; olefin polymers, such as ethylene-butene copolymers and ethylene-propylene copolymers; urethane polymers; styrene polymers, such as styrene-ethylene/butylene-styrene block copolymers (SEBS), styrene-isobutylene-styrene block copolymers (SIBS), styrene-ethylene/propylene-styrene block copolymers (SEPS), styrene-butadiene-styrene block copolymers (SBS), and styrene-isoprene-styrene block copolymers (SIS); conjugated diene polymers including styrene-butadiene copolymers, acrylonitrile-butadiene copolymers, acrylate-butadiene copolymers, hydrogenation products thereof, and the like; silicone polymers such as polyorganosiloxane; ethylene-based ionomer copolymers; polybutadiene; polyisoprenes butadiene-isoprene copolymers; polychloroprene; and the like. One type of them may be used singly or a plurality of the types may be used in combination. Among all, an acrylic polymer or a conjugated diene polymer is preferred as the polymer component with a Tg of −10° C. or less.

Such an acrylic polymer is produced by polymerizing acrylate. Examples of the acrylate used for synthesis of the acrylic polymer may include alkyl acrylates, such as methyl acrylate, ethyl acrylate, propyl acrylate, butyl acrylate, 2-ethylhexyl acrylate, and octyl acrylate. Among all, those produced by polymerizing butyl acrylate or ethyl acrylate are preferred.

For synthesis of the acrylic polymer, as long as the polymer component to be obtained has a Tg of −10° C. or less, another monofunctional polymerizable monomer other than acrylate may be copolymerized, as needed. Examples of such another monofunctional polymerizable monomer to be copolymerized may include: methacrylates, such as methyl methacrylate, ethyl methacrylate, propyl methacrylate, butyl methacrylate, amyl methacrylate, hexyl methacrylate, 2-ethylhexyl methacrylate, cyclohexyl methacrylate, octyl methacrylate, decyl methacrylate, dodecyl methacrylate, octadecyl methacrylate, phenyl methacrylate, benzyl methacrylate, naphthyl methacrylate, and isobornyl methacrylate; aromatic vinyl compounds, such as styrene and α-methylstyrene; acrylonitrile; and the like. The content of units of such another monofunctional monomer is preferably 20 mass % or less to the total monomer units in the acrylic polymer.

For production of such a conjugated diene polymer, as long as the polymer component to be obtained has a Tg of −10° C. or less, another monofunctional polymerizable monomer other than conjugated diene may be copolymerized, as needed. Examples of such another monofunctional polymerizable monomer to be copolymerized may include those described above as another monofunctional polymerizable monomer to be copolymerized with acrylate for production of the acrylic polymer. The content of units of such another monofunctional polymerizable monomer is preferably 20 mass % or less to the total monomer units in the conjugated diene polymer.

The polymer component with a Tg of −10° C. or less preferably has a cross-linked molecular chain structure to exhibit rubber elasticity, and the molecular chain of the polymer component with a Tg of −10° C. or less and the molecular chain of the polymer component with a Tg of 30° C. or more adjacent thereto are preferably grafted by chemical bonding. In this regard, in polymerization of the monomer to form the polymer component with a Tg of −10° C. or less, it is sometimes preferred to use a small amount of a multifunctional polymerizable monomer together as a cross-linker or a grafting agent.

The multifunctional polymerizable monomer used for formation of the polymer component with a Tg of −10° C. or less is a monomer having 2 or more carbon-carbon double bonds in a molecule, and its examples include: esters of unsaturated carboxylic acid, such as acrylic acid, methacrylic acid, and cinnamic acid, with unsaturated alcohol such as allyl alcohol and methallyl alcohol, or glycol such as ethylene glycol and butanediol; esters of dicarboxylic acid, such as phthalic acid, terephthalic acid, isophthalic acid, and maleic acid, with unsaturated alcohol; and the like. Specific examples may include allyl acrylate, methallyl acrylate, allyl methacrylate, methallyl methacrylate, allyl cinnamate, methallyl cinnamate, diallyl maleate, diallyl phthalate, diallyl terephthalate, diallyl isophthalate, divinylbenzene, ethylene glycol di(meth)acrylate, butanediol di(meth)acrylate, hexanediol di(meth)acrylate, and the like. Among all, allyl methacrylate and ethylene glycol di(meth)acrylate are preferably used. It should be noted that the term "di(meth) acrylate" means a collective name for "diacrylate" and "dimethacrylate". One type of them may be used singly or a plurality of the types may be used in combination.

The content of units of the multifunctional polymerizable monomer is preferably 10 mass % or less based on the total monomer units in the polymer component with a Tg of −10° C. or less. An excessively large content of the multifunctional polymerizable monomer units may cause reduction in impact resistance of molded articles to be obtained. It should be noted that, when the monomer having a conjugated diene compound as a main component, the monomer itself functions as a cross-linking or grafting point and thus does not always have to be used together with the multifunctional polymerizable monomer.

Examples of a radically polymerizable monomer used for synthesis of the polymer component with a Tg of 30° C. or more constituting the polymer particles include: alkyl methacrylates, such as methyl methacrylate, ethyl methacrylate, propyl methacrylate, and butyl methacrylate; methacrylates having an alicyclic skeleton, such as cyclohexyl methacrylate, isobornyl methacrylate, and adamantyl methacrylate; methacrylates having an aromatic ring, such as phenyl methacrylate; aromatic vinyl compounds, such as styrene and α-methylstyrene; acrylonitrile; and the like. One type of these monomers may be used singly or a plurality of the types may be used in combination. Examples of a preferred radically polymerizable monomer may include methyl methacrylate and styrene singly and combination of two or more types of radically polymerizable monomer having methyl methacrylate or styrene as a main component.

In synthesis of the polymer component with a Tg of 30° C. or more, it is sometimes preferred to use a small amount of a multifunctional polymerizable monomer. Examples of the multifunctional polymerizable monomer used in this situation may include those described above to be used for formation of the polymer component with a Tg of −10° C. or less. The content of units of the multifunctional polymerizable monomer is preferably 10 mass % or less based on the total monomer units in the polymer component with a Tg of 30° C. or more.

The polymer particles preferably have at least one type of functional group that has reactivity or affinity to hydroxyl groups. This causes, in a resin composition to be obtained, improvement of dispersibility of the polymer particles in the matrix of the EVOH and further improvement of gas barrier properties. These polymer particles may be obtained by using a polymerizable compound having a functional group that has reactivity or affinity to hydroxyl groups as part of the monomer in polymerization reaction to produce the polymer particles. In this context, the functional group may be protected by a protecting group that does not impair the objects of the present invention and is removed when the EVOH and the polymer particles are mixed.

Examples of the radically polymerizable compound having a functional group that has reactivity or affinity to hydroxyl groups may include: unsaturated compounds having a functional group capable of developing an intermolecular bond, such as chemical bonding and hydrogen bonding, by reacting with any of the hydroxyl groups in the EVOH when the EVOH and the polymer particles are mixed; and the like. Examples of the functional group having reactivity or affinity to hydroxyl groups may include: acid groups, such as a hydroxyl group, an epoxy group, an isocyanate group (—NCO), and a carboxyl group; acid anhydride groups, such as maleic anhydride; and the like.

Examples of the unsaturated compound having the functional group may include: polymerizable compounds having a hydroxyl group, such as 2-hydroxyethyl (meth)acrylate, 3-hydroxypropyl (meth)acrylate, 2-hydroxyethyl crotonate, 3-hydroxy-1-propene, 4-hydroxy-1-butene, cis-4-hydroxy-2-butene, and trans-4-hydroxy-2-butene; polymerizable compounds containing an epoxy group, such as glycidyl (meth)acrylate, allyl glycidyl ether, 3,4-epoxybutene, 4,5-epoxypentyl (meth)acrylate, 10,11-epoxyundecyl methacrylate, and p-glycidylstyrene; carboxylic acids, such as (meth) acrylic acid, crotonic acid, cinnamic acid, itaconic acid, maleic acid, citraconic acid, aconitic acid, mesaconic acid, and methylenemalonic acid; and the like. It should be noted that the term "di(meth)acrylate" means a collective name for "diacrylate" and "dimethacrylate", and the term "(meth) acrylic acid" means a collective name for "acrylic acid" and "methacrylic acid".

The radically polymerizable compound having a functional group that has reactivity or affinity to hydroxyl groups is preferably used in the amount from 0.01 to 75 mass % based on the total monomers used for producing the polymer particles and more preferably from 0.1 to 40 mass %. It should be noted that examples of the radically polymerizable compound having a protected functional group may include t-butyl methacrylcarbamate, and the like.

The functional group may be in any polymer component as long as it is capable of substantially reacting with the hydroxyl groups in the EVOH or capable of forming an intermolecular bond. Part of the polymer particles in the resin composition may form chemical bonding with the EVOH, and the functional group having reactivity or affinity to hydroxyl groups is particularly preferably in a molecular chain on the surface of the polymer particles.

In the resin composition, the polymer particles preferably have an average primary particle diameter from 0.2 to 5 µm. The polymer particles having an average primary particle diameter of less than 0.2 µm tends to cause the polymer particles to have an excessively large average secondary particle diameter in resin composition pellets obtained by dry blending the polymer particles and the EVOH and melt extruding. In this context, the secondary particles refer to particles formed by aggregated primary particles. The average primary particle diameter is more preferably 0.3 µm or more and even more preferably 0.35 µm or more. Meanwhile, an average primary particle diameter of more than 5 µm sometimes causes reduction in gas barrier properties due to a decrease in the number of the primary particles constituting each secondary particle. The average primary particle diameter is more preferably 3 µm or less, even more preferably 2 µm or less, particularly preferably 1 µm or less, and most preferably 0.8 µm or less.

In the resin composition, the polymer particles preferably have an average secondary particle diameter from 1 to 10 µm. The relatively small aggregates of the polymer particles thus formed in the resin composition cause further improvement of impact resistance of molded articles to be obtained. The average secondary particle diameter is more preferably 1.1 µm or more, even more preferably 1.5 µm or more, and particularly preferably 2.5 µm or more. Meanwhile, the average secondary particle diameter is more preferably 8 µm or less, even more preferably 6 µm or less, and particularly preferably 5 µm or less. Examples of a method of adjusting the average secondary particle diameter of the polymer particles in a predetermined range may include a method comprising adjusting the screw rotation speed for dry blending, a method comprising increasing the amount of a second-step graft component to be added in synthesis of the polymer particles, and the like.

The polymer particles may be produced by, but not particularly limited to, the methods below, for example. At first, the polymer component with a Tg of −10° C. or less (rubber latex) is obtained by emulsion polymerization. The emulsion polymerization is performed in accordance with a method generally used by those skilled in the art. Subsequently, it is preferred to aggregate the rubber latex thus obtained. This causes further improvement of impact resistance. Examples of a flocculant used for aggregation of the rubber latex may include: organic acids, such as tartaric acid, and salts thereof; inorganic acids, such as hydrochloric acid and sulfuric acid, and salts thereof; and the like.

After aggregating the polymer component with a Tg of −10° C. or less (rubber latex) as needed, the polymer component is subjected to graft polymerization with a radically polymerizable monomer to form a polymer component with a Tg of 30° C. or more. Here, the graft polymerization may be performed by a single step or multi-steps. The total polymerization time is preferably from 5 to 100 hours. The polymerization for a relatively long time causes the radically polymerizable monomer to penetrate the polymer component with a Tg of −10° C. or less and is thus considered to facilitate formation of a sea-island structure. After the graft polymerization, polymer particles are obtained by being separated from the copolymer latex in accordance with a method generally used by those skilled in the art (e.g., method, such as solidification and drying).

In the emulsion polymerization, a general polymerization initiator may be used. Examples of the initiator may include: inorganic peroxides, such as potassium persulfate and sodium persulfate; organic peroxides, such as benzoyl peroxide, cumene hydroperoxide, diisopropylbenzene hydroperoxide, and t-butyl hydroperoxide (BHPO); and oil-soluble initiators, such as azobisisobutyronitrile. One type of them may be used singly or two or more types of them may be used together. These initiators may be used as general redox polymerization initiators used together with a reducing agent, such as sodium sulfite, sodium thiosulfate, sodium formaldehyde sulfoxylate, ascorbic acid, ferrous sulfate, a sodium ethylenediaminetetraacetate complex, and sodium pyrophosphate.

The emulsifier used for the emulsion polymerization is not particularly limited and a general emulsifier for emulsion polymerization may be used. Examples of the emulsifier may include: sulfate-based surfactants, such as sodium alkylsulfate; sulfonate-based surfactants, such as sodium alkylbenzenesulfonate, sodium alkylsulfonate, dioctyl sodium sulfosuccinate, and dioctyl sodium sulfosuccinate; phosphate-based surfactants, such as sodium alkylphosphate ester and sodium polyoxyethylene alkyl ether phosphate ester; anionic surfactants, such as N-acylsarcosinate-based surfactants including sodium N-lauroylsarcosinate, and fatty acid-based surfactants including potassium oleate. The above sodium salts may be another alkali metal salt such as potassium salt, or ammonium salt. One type of these emulsifiers may be used singly or two or more types of them may be used together. Moreover, it is also possible to use nonionic surfactants represented by polyoxyalkylenes and alkyl substituted products and aryl substituted products for terminal hydroxyl groups thereof. The nonionic surfactants may also be partially used together with other emulsifiers. Among them, from the perspective of polymerization reaction stability and particle diameter controllability, sulfonate-based surfactants and phosphate-based surfactants are preferred, and among all, dioctyl sulfosuccinate salt, dioctyl sodium sulfosuccinate, or polyoxyethylene alkyl ether phosphate ester salt may be more preferably used.

Resin Composition

In the resin composition, a mass ratio (polymer particles/EVOH) of the polymer particles to the EVOH is preferably from 1/99 to 40/60. The mass ratio (polymer particles/EVOH) of 1/99 or more causes further improvement of impact resistance of the resin composition. The mass ratio (polymer particles/EVOH) is more preferably 3/97 or more and even more preferably 5/95 or more. The mass ratio (polymer particles/EVOH) of 40/60 or less causes further improvement of gas barrier properties. The mass ratio (polymer particles/EVOH) is more preferably 30/70 or less and even more preferably 25/75 or less.

In the resin composition, the total content of the EVOH and the polymer particles is preferably 50 mass % or more, more preferably 70 mass % or more, even more preferably 80 mass % or more, and particularly preferably 90 mass % or more.

As long as not impairing the effects of the present invention, the resin composition may contain additives other than the EVOH and the polymer particles. Examples of such another additive may include resins other than the EVOH and the polymer components constituting the polymer particles, metal salts, acids, boron compounds, antioxidants, plasticizers, fillers, antiblocking agents, lubricants, stabilizers, surfactants, colorants, ultraviolet absorbers, antistatic agents, drying agents, cross-linkers, filling material, and reinforcing materials such as various types of fiber and the like. Among all, from the perspective of thermal stability of the resin composition and adhesive properties to another resin, metal salts and acids are preferred.

As such a metal salt, alkali metal salt is preferred from the perspective of more increasing interlayer adhesion in the multilayer structure, and alkaline earth metal salt is preferred from the perspective of thermal stability. When the resin composition contains metal salt, its content is preferably from 1 to 10000 ppm in terms of metallic elements. The metal salt content is more preferably 5 ppm or more in terms of metallic elements, even more preferably 10 ppm or more, and particularly preferably 20 ppm or more. Meanwhile, the metal salt content is more preferably 5000 ppm or less in terms of metallic elements, even more preferably 1000 ppm or less, and particularly preferably 500 ppm or less. Examples of a method of measuring the metal salt content may include a method comprising quantitatively determining a sample, obtained by freeze grinding dry EVOH pellets, with an ICP emission spectrometer.

As such an acid, carboxylic acid compounds and phosphoric acid compounds are preferred from the perspective of increasing thermal stability during melt molding. When the resin composition contains such a carboxylic acid compound, its content is preferably from 1 to 10000 ppm. The content of the carboxylic acid compound is more preferably 10 ppm or more and even more preferably 50 ppm or more. Meanwhile, the content of the carboxylic acid compound is more preferably 1000 ppm or less and even more preferably 500 ppm or less. Examples of a method of measuring the acid content may include neutralization titration.

When the resin composition contains such a phosphoric acid compound, its content is preferably from 1 to 10000 ppm. The content of the phosphoric acid compound is more preferably 10 ppm or more and even more preferably 30 ppm or more. Meanwhile, the content of the phosphoric acid compound is more preferably 1000 ppm or less and even more preferably 300 ppm or less. Examples of a method of measuring the content of the phosphoric acid compound may include a method comprising quantitatively determining a sample, obtained by freeze grinding dry EVOH pellets, with an ICP emission spectrometer.

When the resin composition contains such a boron compound, its content is preferably from 1 to 2000 ppm. The content of the boron compound is more preferably 10 ppm or more and even more preferably 50 ppm or more. Meanwhile, the content of the boron compound is more preferably 1000 ppm or less and even more preferably 500 ppm or less. The content of the boron compound in the resin composition in the above range causes further improvement of thermal stability during melt molding. The content of the boron compound may be measured by the same method as that for the phosphoric acid compound described above.

As a method of containing the phosphoric acid compound, the carboxylic acid compound, or the boron compound in the resin composition, a method comprising, for example, adding any of these compounds to the EVOH composition and kneading while producing pellets and the like of the resin composition is preferably employed. Examples of the method of adding any of these compounds to the EVOH composition may include a method comprising adding dry powder, a method comprising adding a paste impregnated with a solvent, a method comprising adding a suspension where the compounds are suspended in a liquid, a method comprising adding a solution where the compounds are dissolved in a solvent, and a method comprising immersing the EVOH pellets in a solution. Among all, from the perspective of homogeneously dispersing the phosphoric acid compound, the carboxylic acid compound, or the boron compound, the method comprising adding a solution where the compounds are dissolved in a solvent and the method comprising immersing the EVOH pellets in a solution are preferred. As the solvent, water, for example, is preferably used from the perspective of solubility of the additive, costs, easy handleability, safety of the work environment, and the like.

The resin composition may be obtained by mixing the EVOH, the polymer particles, and other additives as needed. As a method of mixing them, a known method for mixing a resin may be used. When a melt kneading method is used, it is possible to add the EVOH, the polymer particles, and as needed, antioxidants, stabilizers, dyes, pigments, plasticizers, lubricants, fillers, other resins, and the like, followed by melt kneading, for example, from 180° C. to 300° C. using a screw extruder or the like.

The polymer particles to be used for producing the resin composition may be, for example, in pellets with the surface of the polymer particles sticking to each other as long as they are capable of being sufficiently dispersed in particles when mixed with the EVOH.

Molded Article

A preferred embodiment of the present invention is a molded article containing the resin composition. The resin composition of the present invention is melt molded into various molded articles, such as a film, a sheet, a container, a pipe, and fiber. As a method of melt molding the resin composition, a known method may be employed, such as extrusion molding, inflation extrusion, blow molding, injection molding, and melt spinning. The melting temperature is preferably from 150° C. to 270° C. although depending on the melting point of the EVOH and the like. In this situation, the resin composition of the present invention may be used for molding by temporarily pelletizing or may be directly used for molding by dry blending the EVOH, the polymer particles, and other additives as needed. Such a molded article may also be ground and molded again for reuse. The film, the sheet, the fiber, and the like may also be uniaxially or biaxially oriented or thermoformed for secondary processing.

As a method of blow molding, it is possible to use either extrusion blow molding or injection blow molding. In the extrusion blow molding, although it is possible to cut and cool a pipe that is extrusion molded in advance, followed by heating for blow molding, so-called direct blow molding is preferred in which an extruded tubular molten parison is directly blow molded. Examples of the injection blow molding may include a method comprising: injection molding a closed-end parison in advance; and then blow molding it still at high temperatures while cooling or blow molding by heating it again after cooling.

Although the molded article of the present invention may be monolayered or multilayered, a multilayer structure having a layer of the resin composition is preferred. The multilayer structure generally has a thickness, but not particularly limited to, from 10 to 5000 μm. A ratio (resin composition layer/multilayer structure) of the thickness of the resin composition layer to the thickness of the multilayer structure is preferably from 0.02 to 0.2. A thickness ratio (resin composition layer/multilayer structure) of more than 0.2 may cause degradation of the moldability and higher costs. Meanwhile, a thickness ratio (resin composition layer/multilayer structure) of less than 0.02 may cause reduction in gas barrier properties.

Where A denotes a layer of a thermoplastic resin other than the EVOH, B denotes a resin composition layer, and C denotes an adhesive resin layer, examples of the layer structure of the multilayer structure include, but not particularly limited to, layer structures, such as N/B, A/B/A, A/C/B, A/C/B/C/A, A/B/NB/A, and A/C/B/C/NC/B/C/A. It is certainly possible to add still other layers to these structures. When providing a plurality of layers of such another thermoplastic resin, different resins may be used or the same resins may be used. Moreover, a layer using a recovered resin formed from trimmed portions produced during molding and scraps of out-of-specification molded articles and the like may be separately provided, or a layer of a blend of a recovered resin and another thermoplastic resin may be provided as the layer of such another thermoplastic resin.

As a resin used for the adhesive resin layer, it is preferred to use, for example, polyurethane-based or polyester-based one- or two-component curable adhesives; or polyolefins having a carboxyl group, a carboxylic anhydride group, or an epoxy group. Among all, from the perspective of having excellent adhesive properties to both EVOH and polyolefin, polyolefins having a carboxyl group, a carboxylic anhydride group, or an epoxy group are more preferred.

Examples of the polyolefin containing a carboxyl group may include polyolefins produced by copolymerizing acrylic acid or methacrylic acid, and the like, and all or part of the carboxyl groups contained in the polyolefin may be in the form of metal salt as represented by ionomer. Examples of the polyolefin having a carboxylic anhydride group may include polyolefins graft modified with maleic anhydride or itaconic acid. Examples of the polyolefin-based resin containing an epoxy group may include polyolefins produced by copolymerizing glycidyl methacrylate. Among all, polyolefins modified with carboxylic anhydrides, such as maleic anhydride, and in particular polyethylene are preferred from the perspective of having excellent adhesive properties.

Examples of the thermoplastic resin used for the layer of another thermoplastic resin may include: polyolefins, such as polyethylene (linear low density polyethylene, low density polyethylene, medium density polyethylene, high density polyethylene), ethylene-vinyl acetate copolymers, ethylene-propylene copolymers, polypropylene, propylene-α-olefin copolymers, polybutene, and polypentene; polyesters, such as polyethylene terephthalate; polyester elastomers; polyamides, such as nylon 6 and nylon 66; polystyrenes; polyvinyl chlorides; polyvinylidene chlorides; acrylic resins; vinyl ester-based resins; polyurethane elastomers; polycarbonates; chlorinated polyethylenes; and chlorinated polypropylenes. Among all, polypropylene, polyethylene, ethylene-propylene copolymers, ethylene-vinyl acetate copolymers, polystyrenes, and polyesters are preferred.

As a method of producing the multilayer structure, a known method may be used, such as coextrusion molding, coinjection molding, and extrusion coating.

As a method of producing a blow molded container of the multilayer structure, coextrusion blow molding and coinjection blow molding are preferably employed. Preferred examples of the coextrusion blow molding method may include so-called direct blow molding in which the resin composition, another thermoplastic resin, and an adhesive resin, as needed, are fed to separate extruders using a multilayer extruder having at least 2 extruders and are separately kneaded and melt extruded, and each layer is extruded to be tightly joined inside a die for multilayer parison molding or outside immediately after discharged from the die to obtain a tubular multilayer parison, and then the parison is blow molded in a molten state to obtain a multilayer container.

The molded article obtained using the resin composition of the present invention has high gas barrier properties and is also excellent in impact resistance, particularly impact resistance at low temperatures. Accordingly, the molded article is useful as packaging materials for foods, pharmaceuticals, medical equipment and supplies, garments, and the like and also useful as a material for fuel tanks, fuel pipes, and the like seeking impact resistance at low temperatures.

EXAMPLES

The present invention is more specifically described below with reference to Examples.
Structure Observation of Polymer Particles
Pretreatment, Staining A ultramicrotome (model: Ultracut S/FC-S) manufactured by Leica was used to cut resin composition pellets obtained in each Example and Comparative Example to prepare an ultrathin section for transmission electron microscope observation. It should be noted that the cutting conditions were as follows.

Sample: −100° C.
Knife: −100° C.
Cutting Speed: from 0.4 to 1.0 mm/s
Cutting Thickness Setting: 85 nm
Thickness: 85 nm The ultrathin sections thus obtained were collected on a copper mesh (1000 mesh) and subjected to electron staining using a phosphomolybdic acid solution.
Structure Observation The morphology was observed in the following conditions. For observation of the structure of the polymer particles, a transmission electron microscope (model: HT7700, 3D TEM compatible), manufactured by Hitachi High-Technologies Corp., equipped with an $LaB_6$ electron gun was used.

Accelerating Voltage: 100 KV
Amount of $LaB_6$ Electron Beam Irradiation: 10 µA
Electron Beam Spot Size: 1 µm
Condenser Aperture Diameter: 0.1 mm (No. 2)
3D Object Variable Aperture Diameter: 0.16 mm (No. 3)
Photographic Recording CCD Camera: Bottom Mounted Camera (Model: XR81B, 8-Mega Pixel Camera) manufactured by AMT Imaging Binarization The light region area, the dark region area, the average primary particle diameter, the average secondary particle diameter, and the thickness of the film were calculated by performing image analysis of a map image in which all the observation visual field is covered by the cross section of the resin composition pellets. As image analysis software, Image-Pro Plus produced by Nippon Roper K.K. was used. In the image analysis, at first, the contour of the particle portions in the map image was traced to calculate the average primary particle diameter and the average secondary particle diameter of the polymer particles and the areas of the light region and the dark regions. The particle contour tracing was performed for a contrast-controlled map. The contrast control was automatically applied using a "contrast optimal matching" command of the image analysis software. In addition, using a binarizing "Segmentation (color extraction)" command, the particle portions were separated and extracted from the background (LSCF region). Specifically, the image was converted into a black and white image where the white regions in the contrast-controlled map were defined as light regions for binarization.

Then, in the polymer particles (primary particles) in the map image after binarization, the total white regions were defined as the light region area and the total black regions were defined as the dark region area. The map image after binarization was used to obtain the total area of the dark regions (island components) in a region (FIG. 2 illustrates the region) where the distance from the center of gravity of the cross section of the polymer particles (primary particles) is 75% or less of the distance from the center of gravity to the contour of the cross section. In addition, the map image after binarization was used to obtain the thickness of the film (dark regions) covering on the surface of the polymer particles (primary particles). It should be noted that the areas of the light region and the dark regions were obtained as arithmetic averages of the number of particles included in the observation visual field.

The average primary particle diameter and the average secondary particle diameter of the polymer particles were obtained as arithmetic averages of the longest lengths between the particle contours, and the average particle diameters were calculated from the number and the particle diameters of particles included in the observation visual field.

Oxygen Transmission Rate (OTR)
Preparation of Monolayer Film

Monolayer films with a thickness of 20 µm were obtained by forming films of the resin composition pellets obtained in Examples and Comparative Examples using a single-screw extruder (D2020 by Toyo Seiki Seisaku-sho, Ltd., D (mm) =20, L/D=20, compression ratio=3.0, screw:full flight). The extrusion conditions were as described below.

Extrusion Temperature: 220° C.
Die Width: 30 cm
Take Off Roll Temperature: 80° C.
Screw Rotation Speed: 45 rpm
Take Off Roll Speed: 3.4 m/min.

The monolayer films with a thickness of 20 µm thus obtained were humidity controlled under the conditions of 20° C./65% RH and then subjected to oxygen transmission rate (OTR) measurement using an oxygen transmission rate measuring device (OX-Tran 2/20 manufactured by MOCON Inc.).

Impact Resistance Evaluation
Production of Blow Molded Container

Using the resin composition pellets thus obtained, a high density polyethylene resin [density of 0.96 g/cc, MFR (measured at 210° C. under a load of 2160 g) of 0.5 g/10 min.], and an adhesive resin ("ADMER GT-6A" produced by Mitsui Chemicals, Inc.), a 3-material 5-layer parison of (inside) high density polyethylene/adhesive resin/resin composition/adhesive resin/high density polyethylene (outside) was discharged for 2 hours at 210° C. by a blow molding machine TB-ST-6P manufactured by Suzuki Seikosho and then the operation was suspended for 2 hours while still in the heated state. The operation was then restarted to produce a blow molded container after a predetermined time passed. In this situation, cooling was performed at a temperature in the mold of 15° C. for 20 seconds to mold a 500 mL tank (blow molded container) with a total layer thickness of 940 µm [(inside) high density polyethylene/adhesive resin/resin composition/adhesive resin/high density polyethylene (outside)=(inside) 400/50/40/50/400 µm (outside)]. This tank had a bottom diameter of 100 mm and a height of 400 mm.

Drop Test

The 500 mL tank thus obtained was filled with 400 mL of ethylene glycol and the opening was covered by heat sealing with a multilayer film of polyethylene 40 μm/aluminum foil 12 μm/polyethylene terephthalate 12 μm. The tank was cooled at −40° C. for 3 days, and then dropped from a height of 6 m by putting the opening directed above to check whether the tank was broken. In the same manner, 10 tanks were tested to evaluate impact resistance from the number of broken tanks.

Evaluation Criteria for Impact Resistance

A: less than 2 broken tanks
B: 2 or more and less than 4 broken tanks
C: 4 or more and less than 6 broken tanks
D: 6 or more broken tanks Production of EVOH-1

In 18 kg of a mixed solvent of water/methanol=40/60 (mass ratio), 2 kg of an EVOH resin with an ethylene unit content of 32 mol % and a degree of saponification of 99.8 mol % was put and stirred at 60° C. for 6 hours to be completely dissolved. This solution was continuously extruded from a nozzle with a diameter of 4 mm into a coagulation bath of water/methanol=90/10 (mass ratio) controlled at 0° C. to solidify the EVOH in strand. The strand was introduced into a pelletizer to obtain porous EVOH chips.

The porous EVOH chips thus obtained were washed using an aqueous acetic acid solution and deionized water, followed by immersion treatment in an aqueous solution containing acetic acid, potassium dihydrogenphosphate, sodium acetate, and orthoboric acid. The EVOH chips were separated from the aqueous solution for the treatment and were deliquored, and then put in a hot air drier for drying at 80° C. for 4 hours and further at 100° C. for 16 hours to obtain dry EVOH pellets (EVOH-1). The EVOH-1 had an acetic acid content of 150 ppm, a sodium ion content of 140 ppm, a phosphoric acid compound content of 45 ppm in terms of phosphate radicals, and a boron compound content of 260 ppm in terms of boron. The EVOH-1 had a MFR (ASTM-D1238, under a load of 2160 g) of 3.7 g/10 min.

Production of EVOH-2 and EVOH-3

EVOH-2 and EVOH-3 were produced in the same manner as EVOH-1 except for using an EVOH resin with an ethylene unit content of 27 mol % and a degree of saponification of 99.9 mol % (EVOH-2) or an EVOH resin with an ethylene unit content of 44 mol % and a degree of saponification of 99.9 mol % (EVOH-3). EVOH-2 and EVOH-3 had the same contents of the acetic acid, sodium ions, phosphoric acid compounds, and the boron compounds as that of EVOH-1. EVOH-2 and EVOH-3 had respective MFRs (ASTM-D1238, under a load of 2160 g) of 4.0 g/10 min. and 3.3 g/10 min.

Production of Polymer Particles-1

Each component below was charged in a pressure resistant container with a stirrer, and polymerization was performed at 45° C. for 16 hours and completed. The polymerization yield was approximately 100%.

| Rubber Component | |
|---|---|
| n-butyl acrylate | 70 parts by mass |
| ethylene glycol dimethacrylate | 0.2 parts by mass |
| diisopropylbenzene hydroperoxide | 0.195 parts by mass |
| ferrous sulfate (FeSO$_4$•7H$_2$O) | 0.002 parts by mass |
| sodium ethylenediaminetetraacetate | 0.003 parts by mass |
| formaldehyde sodium sulfoxylate | 0.049 parts by mass |
| potassium oleate | 0.9 parts by mass |
| sodium pyrophosphate phosphate | 0.1 parts by mass |
| distilled water | 175 parts by mass |

To the total amount of the rubber latex thus obtained, 0.035 parts by mass of dioctyl sodium sulfosuccinate were added, and after sufficiently stabilized, 2 mass % of an aqueous tartaric acid solution and 2 mass % of an aqueous sodium hydroxide solution were further gradually added to aggregate the primary particles under the conditions of pH 7 to 9.

To the rubber latex thus obtained, a first-step graft component described below was added to continue polymerization at 45° C. for 16 hours. The polymerization yield was approximately 100%.

| First-Step Graft Component | |
|---|---|
| methyl methacrylate | 14 parts by mass |
| glycidyl methacrylate | 3 parts by mass |
| ethylene glycol dimethacrylate | 0.12 parts by mass |
| diisopropylbenzene hydroperoxide | 0.02 parts by mass |
| formaldehyde sodium sulfoxylate | 0.01 parts by mass |
| dioctyl sodium sulfosuccinate | 0.03 parts by mass |

To the latex thus obtained, a second-step graft component described below was further added to continue polymerization at 45° C. for 16 hours. The polymerization yield was approximately 100%.

| Second-Step Graft Component | |
|---|---|
| methyl methacrylate | 13 parts by mass |
| ethylene glycol dimethacrylate | 0.1 parts by mass |
| diisopropylbenzene hydroperoxide | 0.015 parts by mass |

The latex thus obtained was subjected to salting out in an aqueous sodium chloride solution, and filtered, washed with water, and dried for aftertreatment to obtain Polymer Particles-1 of a multicomponent grafted resin.

Production of Polymer Particles-2

Polymer Particles-2 were produced in the same manner as Polymer Particles-1 except for changing the amounts of the respective components as below.

| Rubber Component | |
|---|---|
| n-butyl acrylate | 90 parts by mass |
| First-Step Graft Component | |
| methyl methacrylate | 2 parts by mass |
| Second-Step Graft Component | |
| methyl methacrylate | 5 parts by mass |

Production of Polymer Particles-3

Polymer Particles-3 were produced in the same manner as Polymer Particles-1 except for changing the amounts of the respective components as below.

| Rubber Component | |
|---|---|
| n-butyl acrylate | 60 parts by mass |
| First-Step Graft Component | |
| methyl methacrylate | 19 parts by mass |
| Second-Step Graft Component | |
| methyl methacrylate | 18 parts by mass |

Production of Polymer Particles-4

Polymer Particles-4 were produced in the same manner as Polymer Particles-1 except for changing the amounts of the respective components as below.

| Rubber Component | |
|---|---|
| n-butyl acrylate | 40 parts by mass |
| First-Step Graft Component | |
| methyl methacrylate | 29 parts by mass |
| Second-Step Graft Component | |
| methyl methacrylate | 28 parts by mass |

Production of Polymer Particles-5

Polymer Particles-5 were produced in the same manner as Polymer Particles-1 except for changing the amounts of the respective components as below.

| Rubber Component | |
|---|---|
| n-butyl acrylate | 23 parts by mass |
| First-Step Graft Component | |
| methyl methacrylate | 5 parts by mass |
| Second-Step Graft Component | |
| methyl methacrylate | 4 parts by mass |

Production of Polymer Particles-6

Polymer Particles-6 were produced in the same manner as Polymer Particles-1 except for changing the amounts of the respective components as below.

| Rubber Component | |
|---|---|
| n-butyl acrylate | 140 parts by mass |
| potassium oleate | 0.01 parts by mass |
| First-Step Graft Component | |
| methyl methacrylate | 28 parts by mass |

Production of Polymer Particles-7

Polymer Particles-7 were produced in the same manner as Polymer Particles-1 except for changing the amounts of the respective components as below.

| First-Step Graft Component | |
|---|---|
| methyl methacrylate | 24 parts by mass |
| Second-Step Graft Component | |
| methyl methacrylate | 3 parts by mass |

Production of Polymer Particles-8

Polymer Particles-8 were produced in the same manner as Polymer Particles-1 except for changing the amounts of the respective components as below.

| First-Step Graft Component | |
|---|---|
| methyl methacrylate | 3 parts by mass |
| Second-Step Graft Component | |
| methyl methacrylate | 24 parts by mass |

Production of Polymer Particles-9

Polymer Particles-9 were produced in the same manner as Polymer Particles-1 except for using styrene instead of methyl methacrylate as the first-step graft component and the second-step graft component.

Production of Polymer Particles-10

Polymer Particles-10 were produced in the same manner as Polymer Particles-1 except for not performing polymerization of the first-step graft component and the second-step graft component.

Example 1

After dry blending 90 parts by mass of EVOH-1 as the EVOH and 10 parts by mass of Polymer Particles-1 as the polymer particles at the screw rotation speed of 50 rpm, a mixture obtained by extrusion at a temperature of 200° C. using a 30 mmφ co-rotating twin-screw extruder ("TEX-30N" manufactured by Japan Steel Works, Ltd.) was pelletized to obtain resin composition pellets.

The resin composition pellets thus obtained were subjected to structure observation by the method described above. FIGS. 1 and 2 illustrate a transmission electron microscope image (before binarization) of a cross section of the polymer particles in the observed resin composition pellets. From FIGS. 1 and 2, Polymer Particles-1 were confirmed in which a plurality of primary particles aggregated in the matrix of EVOH-1 to form secondary particles. The primary particles were formed of a sea component (light region) of a polymer component having n-butyl acrylate with a Tg of −39° C. as a main component and a plurality of island components (dark regions) of a polymer component having methyl methacrylate with a Tg of 106° C. as a main component. Polymer Particles-1 had an average primary particle diameter of 0.4 μm and an average secondary particle diameter of 3 μm. The primary particles had a surface covered with a film (dark region) formed of the same polymer component as the island components, and the ratio (thickness of the film/average primary particle diameter) of the thickness of the film to the average primary particle diameter was 0.02. In addition, the total area of the dark regions (island components) was obtained in a region (FIG. 2 illustrates the region) where the distance from the center of gravity of the cross section of the primary particles was 75% or less of the distance from the center of gravity to the contour of the cross section. Then, the area ratio of the total area of the dark regions (island components) in the region to the total area of the dark regions (island components) in the cross section of the primary particles was obtained as 0.62. The resin composition pellets thus obtained were used to evaluate the oxygen transmission rate and the impact resistance. The results are shown in Table 1.

Examples 2 Through 9

Resin composition pellets were produced and evaluated in the same manner as Example 1 except for changing the type of polymer particles to be used to those shown in Table 1. The results are shown in Table 1.

Example 10

Resin composition pellets were produced and evaluated in the same manner as Example 1 except for changing the screw rotation speed for dry blending the EVOH and the polymer particles to 80 rpm. The results are shown in Table 1.

Example 11

Resin composition pellets were produced and evaluated in the same manner as Example 1 except for respectively adding 70 parts by mass of EVOH-1 and 30 parts by mass of Polymer Particles-1. The results are shown in Table 1.

Examples 12 and 13

Resin composition pellets were produced and evaluated in the same manner as Example 1 except for changing the type of EVOH to be used to those shown in Table 1. The results are shown in Table 1.

Comparative Example 1

Resin composition pellets were produced and evaluated in the same manner as Example 1 except for using core-shell particles ("PARALOID EXL-2300G" produced by Dow Inc.) instead of Polymer Particles-1. The core-shell particles used in this example had a structure in which one core is covered with a shell surrounding the core. The results are shown in Table 1.

Comparative Example 2

Resin composition pellets were produced and evaluated in the same manner as Example 1 except for using Polymer Particles-10 instead of Polymer Particles-1. The results are shown in Table 1.

Comparative Example 3

Resin composition pellets were produced and evaluated in the same manner as Example 1 except for polyamide (PA) ("ULTRAMID C40LN" produced by BASF SE) instead of EVOH-1. The results are shown in Table 1.

TABLE 1

| | | | Example 1 | Example 2 | Example 3 | Example 4 | Example 5 | Example 6 |
|---|---|---|---|---|---|---|---|---|
| Resin Composition | Polymer Particles | Type | 1 | 2 | 3 | 4 | 5 | 6 |
| | | Light Region Area[1] (Sea, Area %) | 70 | 90 | 60 | 40 | 70 | 70 |
| | | Dark Region Area[1] (Islands and Film, Area %) | 30 | 10 | 40 | 60 | 30 | 30 |
| | | Composition (Light Region/Dark Regions) | BA/MMA | BA/MMA | BA/MMA | BA/MMA | BA/MMA | BA/MMA |
| | | Glass Transition Temperature (° C., Light Region/Dark Regions) | −39/106 | −39/106 | −39/106 | −39/106 | −39/106 | −39/106 |
| | | Average Primary Particle Diameter (μm) | 0.4 | 0.4 | 0.4 | 0.4 | 0.2 | 1.2 |
| | | Average Secondary Particle Diameter (μm) | 3 | 3 | 3 | 3 | 3 | 4 |
| | | Ratio (Film Thickness/Average Primary Particle Diameter) | 0.02 | 0.005 | 0.03 | 0.03 | 0.02 | 0.02 |
| | | Area Rate[3] | 0.62 | 0.51 | 0.78 | 0.81 | 0.62 | 0.62 |
| | | Content (mass %) | 10 | 10 | 10 | 10 | 10 | 10 |
| | EVOH | Type | 1 | 1 | 1 | 1 | 1 | 1 |
| | | Ethylene Content (mol %) | 32 | 32 | 32 | 32 | 32 | 32 |
| | | Content (mass %) | 90 | 90 | 90 | 90 | 90 | 90 |
| Evaluation | | Barrier Properties (cc · 20 μm/m² · day · atm) | 0.4 | 0.4 | 0.4 | 0.4 | 0.4 | 0.4 |
| | | Impact Resistance | A | A | A | C | A | C |

| | | | Example 7 | Example 8 | Example 9 | Example 10 | Example 11 | Example 12 |
|---|---|---|---|---|---|---|---|---|
| Resin Composition | Polymer Particles | Type | 7 | 8 | 9 | 1 | 1 | 1 |
| | | Light Region Area[1] (Sea, Area %) | 70 | 70 | 70 | 70 | 70 | 70 |
| | | Dark Region Area[1] (Islands and Film, Area %) | 30 | 30 | 30 | 30 | 30 | 30 |
| | | Composition (Light Region/Dark Regions) | BA/MMA | BA/MMA | BA/St | BA/MMA | BA/MMA | BA/MMA |
| | | Glass Transition Temperature (° C., Light Region/Dark Regions) | −39/106 | −39/106 | −39/106 | −39/106 | −39/106 | −39/106 |
| | | Average Primary Particle Diameter (μm) | 0.4 | 0.4 | 0.4 | 0.4 | 0.4 | 0.4 |

TABLE 1-continued

|  |  |  |  |  |  |  |  |
|---|---|---|---|---|---|---|---|
|  | Average Secondary Particle Diameter (μm) | 1 | 8 | 3 | 2 | 3 | 3 |
|  | Ratio (Film Thickness/Average Primary Particle Diameter) | 0.02 | 0.02 | 0.04 0.62 | 0.02 0.62 | 0.02 0.62 | 0.02 0.62 |
|  | Area Rate[3] | 0.62 | 0.62 | 10 | 10 | 30 | 10 |
|  | Content (mass %) | 10 | 10 | 1 | 1 | 1 | 2 |
| EVOH | Type | 1 | 1 1 | 32 | 32 | 32 | 27 |
|  | Ethylene Content (mol %) | 32 | 32 | 90 | 90 | 70 | 90 |
|  | Content (mass %) | 90 | 90 |  |  |  |  |
| Evaluation | Barrier Properties (cc · 20 μm/m² · day · atm) | 0.4 | 0.7 | 0.4 | 0.4 | 0.8 | 0.3 |
|  | Impact Resistance | B | A | C | A | A | C |

|  |  | Example 13 | Comparative Example 1 | Comparative Example 2 | Comparative Example 3 |
|---|---|---|---|---|---|
| Resin Composition | Polymer Particles Type | 1 | Core-Shell[2] | 10 | 1 |
|  | Light Region Area[1] (Sea, Area %) | 70 | 70 | 100 | 70 |
|  | Dark Region Area[1] (Islands and Film, Area %) | 30 | 30 | 0 | 30 |
|  | Composition (Light Region/Dark Regions) | BA/MMA | BA/MMA | BA | BA/MMA |
|  | Glass Transition Temperature (° C., Light Region/Dark Regions) | −39/106 | −39/106 | −39 | −39/106 |
|  | Average Primary Particle Diameter (μm) | 0.4 | 0.4 | 0.3 | 0.4 |
|  | Average Secondary Particle Diameter (μm) | 3 | 3 | 2 | 3 |
|  | Ratio (Film Thickness/Average Primary Particle Diameter) | 0.02 | 0.05 | — | 0.05 |
|  | Area Rate[3] | 0.62 | [4] | — | 0.62 |
|  | Content (mass %) | 10 | 10 | 10 | 10 |
|  | EVOH Type | 3 | 1 | 1 | PA[5] |
|  | Ethylene Content (mol %) | 44 | 32 | 32 | — |
|  | Content (mass %) | 90 | 90 | 90 | 90 |
| Evaluation | Barrier Properties (cc · 20 μm/m² · day · atm) | 0.7 | 0.5 | 0.8 | 50 |
|  | Impact Resistance | A | D | D | D |

[1] Area Rate of Light Region or Dark Regions to Polymer Particle Area
[2] Core-Shell Particles: "PARALOID EXL-2300G" by Dow Inc.
[3] Area Rate of Dark Regions (Island Components) in Region where Distance from Center of Gravity of Cross Section of Polymer Particles (Primary Particles) was 75% or less of Distance from Center of Gravity to Contour of Cross Section
[4] Less than 0.1
[5] "ULTRAMID C40LN" by BASF SE

The invention claimed is:

1. A resin composition comprising polymer particles having a sea-island structure dispersed in a matrix of an ethylene-vinyl alcohol copolymer,
wherein one of a sea component and an island component of the sea-island structure has a glass transition temperature of 30° C. or more and the other has a glass transition temperature of −10° C. or less, and the island component is dispersed in the sea component.

2. The resin composition according to claim 1, wherein the sea component has a glass transition temperature of −10° C. or less and the island component has a glass transition temperature of 30° C. or more.

3. The resin composition according to claim 1, wherein an area ratio of a polymer component with a glass transition temperature of 30° C. or more to a polymer component with a glass transition temperature of −10° C. or less is from 5/95 to 70/30 in a transmission electron microscope image of a cross section of the polymer particles.

4. The resin composition according to claim 1, wherein the polymer particles have a surface covered with a film formed of a same polymer component as the island component.

5. The resin composition according to claim 1, wherein the polymer particles aggregate and form secondary particles.

6. The resin composition according to claim 5, wherein the polymer particles have an average primary particle diameter from 0.2 to 1 μm.

7. The resin composition according to claim 5, wherein the polymer particles have an average secondary particle diameter from 1.1 to 10 μm.

8. The resin composition according to claim 1, wherein the polymer particles contain an acrylic polymer.

9. The resin composition according to claim 1, wherein a mass ratio of the polymer particles to the ethylene-vinyl alcohol copolymer is from 1/99 to 40/60.

10. The resin composition according to claim 1, wherein the ethylene-vinyl alcohol copolymer has an ethylene content from 20 to 50 mol %.

11. The resin composition according to claim 1, wherein an area ratio of a polymer component with a glass transition temperature of 30° C. or more to a polymer component with a glass transition temperature of −10° C. or less is from 10/90 to 50/50 in a transmission electron microscope image of a cross section of the polymer particles.

12. The resin composition according to claim 1, wherein a mass ratio of the polymer particles to the ethylene-vinyl alcohol copolymer is from 5/95 to 30/70.

13. The resin composition according to claim 1, wherein a mass ratio of the polymer particles to the ethylene-vinyl alcohol copolymer is from 5/95 to 25/75.

14. The resin composition according to claim 5, wherein the polymer particles have an average primary particle diameter from 0.3 to 0.8 µm.

15. The resin composition according to claim 5, wherein the polymer particles have an average secondary particle diameter from 2.5 to 5 µm.

16. The resin composition according to claim 1, wherein a total content of the ethylene-vinyl alcohol copolymer and the polymer particles in the resin composition is 70 mass % or more.

17. The resin composition according to claim 1, wherein a total content of the ethylene-vinyl alcohol copolymer and the polymer particles in the resin composition is 90 mass % or more.

18. The resin composition according to claim 1, wherein the polymer particles contain a conjugated diene polymer.

19. The resin composition according to claim 1, wherein the sea-island structure excludes a core-shell structure.

20. The resin composition according to claim 1, wherein the resin composition excludes resins other than the EVOH and the polymer components constituting the polymer particles.

* * * * *